United States Patent

[11] 3,593,150

[72] Inventors Hisakichi Michishita; Kazuo Kwai, both of Tokyo-to, Japan
[21] Appl. No. 876,166
[22] Filed Dec. 3, 1969
[45] Patented July 13, 1971
[73] Assignee Kakusai Denshin Denwa Kabushiki Kaisha Tokyo-to, Japan
[32] Priority Sept. 13, 1965, May 2, 1966
[33] Japan
[31] 40/55712 41/27603
Continuation of application Ser. No. 577,952, Sept. 8, 1967, now abandoned.

[54] PHASE- AND FREQUENCY-FLUCTUATION INCLUDED IN A TRANSMITTED SIGNAL
6 Claims, 9 Drawing Figs.

[52] U.S. Cl. .......... 325/422, 325/476, 328/155
[51] Int. Cl. .......... H04b 3/04, H04b 3/10
[50] Field of Search .......... 325/63, 65, 416, 420, 421, 422, 320, 430, 431, 433, 473, 476, 346, 321, 323; 328/155; 333/17, 18; 178/69.5, 69.5 DC; 179/50

[56] References Cited

UNITED STATES PATENTS

| | | | |
|---|---|---|---|
| 3,358,234 | 12/1967 | Stover .......... | 325/63 X |
| 3,361,976 | 1/1968 | Konian .......... | 325/421 |
| 3,453,552 | 7/1969 | Whang et al. .......... | 328/155 |

*Primary Examiner*—Benedict V. Safourek
*Attorney*—Robert E. Burns

ABSTRACT: A system for eliminating phase- and frequency-fluctuations in transmitted signals including a reference signal of phase-position or frequency, where the transmission times of the respective signals are at first equalized by passing the transmitted signals through an equilizer compensating the transmission characteristic of a transmission medium at one end of which the fluctuations occur, and the fluctuations included in the transmitted signals are simultaneously eliminated by combining the transmitting signals passed through the equalizing means with a different signal between phase-positions or frequencies of a standard signal of stable phase-position and the transmitted reference signal in synchronous timing of the fluctuations. thereof.

PHASE- AND FREQUENCY-FLUCTUATION INCLUDED IN A TRANSMITTED SIGNAL

This is a continuation of our earlier filed application, Ser. No. 577,952, filed on Sept. 8, 1967, now abandoned, in which we claimed benefit of our Japanese applications No. 55712 filed on Sept. 13, 1965, and No. 27603 filed on May 2, 1966.

This invention relates to a system for eliminating phase- and frequency-fluctuations of or transmitted signals included the reference signal of phase-position or frequency.

In order to eliminate phase- and frequency-fluctuations in transmitted signals of the kind, such as phase-modulated telegraphic signals and frequency division multiplex telecommunication signals etc., there have been heretofore proposed automatic frequency control systems or automatic phase control systems (hereinafter referred to as "ACS") in each of which a feedback loop is adopted for compensating such fluctuation. The conventional ACS, however, provides the feedback loop which includes an integrator having a considerable time constant necessary for improving protection ratio of the ACS against disturbance, such as noise. Accordingly, there exists in the conventional ACS system inconsistency between instantaneous fluctuations of a detected error signal and a signal to be compensated. As a result of the inconsistency, it is impossible in the conventional ACS to completely eliminate the phase- and frequency-fluctuation, or it is liable frequently to disturb a correct phase position or a correct frequency of the transmitted signal.

An object of this invention is to provide a system for eliminating, without inconsistency, phase- and frequency-fluctuation in a transmitted signal or transmitted signals.

Another object of this invention is to provide a system for eliminating, by no use of a feedback loop, phase- and frequency-fluctuation in a transmitted signal or transmitted signals.

These objects and other objects of this invention have been attained by the system of this invention, comprising generator means for generating a standard signal having a substantially stable phase-position or a substantially stable frequency. Detection means are provided for detecting a difference between phase-position or frequency of the transmitted reference signal and the standard signal; delay means delay the transmitted reference signal by a given delay time, and combine means for combining the transmitted reference signal passed through the delay means with the difference to cancel the fluctuation. The delay time is determined so that an instantaneous fluctuated phase-position or frequency of the transmitted reference signal is timed with an instantaneous fluctuated value of the difference at the combine means, whereby a reference signal from which fluctuation is eliminated is obtainable from the combine means.

The system can be further provided with, before the detecting means, means for deriving the reference signal from transmitted signals including the reference signal, whereby fluctuations included in said transmitted signals are simultaneously eliminated in the system.

The system can be provided with means for equalizing transmission times of the respective transmitted signals in a transmission medium at one end of which the fluctuation occurs and at the other end of which the system is positioned, the transmitted signals being applied through this means to the system.

The novel features of this invention are set forth with particularity in the appended claims, however, this invention, both as to its constitution and operation together with other objects and advantages thereof, may best be understood by reference to the following description, taken in connection with the accompanying drawings, in which the same or equivalent parts are designated by the same characters, numerals and symbols as to each other, and in which:

Figure 1:
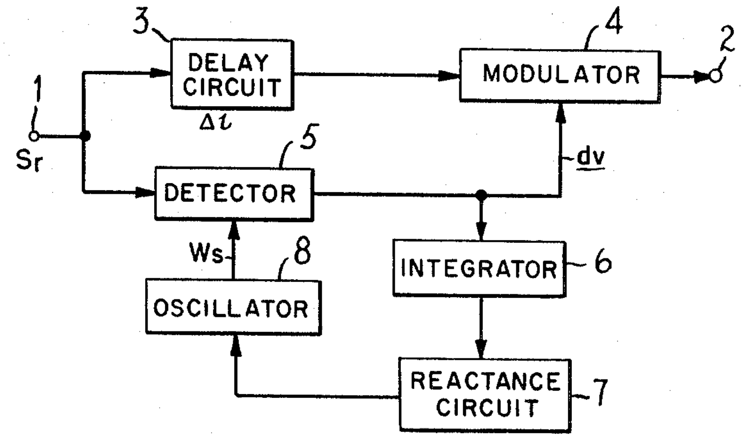
FIGS. 1, 2, 3, 4, 5 and 7 are respectively block diagrams for illustrating embodiments of this invention.

Referring to FIG. 1, an embodiment of this invention, in which fluctuations included in a transmitted reference signal $Sr$ which is to have a stable phase-position or frequency is eliminated, is described. In this embodiment, there are provided with a delay circuit 3, a modulator 4, a detector 5, and an oscillator 8 controlled by an integrator 6 and a reactance circuit 7. Fluctuations of the phase-position and of frequency of the reference signal $Sr$ is eliminated in this embodiment. In the following description elimination of the fluctuation of the phase-position is explained.

The transmitted reference signal $Sr$ including fluctuations of its phase-position is applied to the detector 5 and the delay circuit 3 from an input terminal 1. The oscillator 8 generates a standard signal $Ws$ the frequency of which is substantially equal to that of the transmitted reference signal $Sr$. At the detector 5, a difference between phase-positions of the transmitted reference signal $Sr$ and the standard signal $Ws$ is detected. This detected difference is applied, through the integrator 6 such as a low-pass filter, to the reactance circuit 7 and controls the oscillator 8, so that the phase-position of the standard signal $Ws$ coincides with phase-position of the reference signal $Sr$. In this case, a time constant of a loop circuit comprising the detector 5, the integrator 6, the reactance circuit 7 and the oscillator 8 has a considerably large value so that the standard signal $Ws$ is accompanied by very slow fluctuation only of the phase-position of the reference signal $Sr$. Accordingly, the phase-position of the standard signal $Ws$ is locked to a substantially stable value. Since the reference signal $Sr$, which is disturbed in a transmission medium (such as a transmission line including a plurality of repeaters) includes very rapid components of fluctuation-in-phase-position, the phase position of the standard signal $Ws$ follow on this very rapid components of the fluctiation-in-phase-position. As a result of such operation, a detected voltage $dv$ of the detector 5 has an instantaneous level substantially proportional to the very rapid components of the fluctuation-in-phase-position included in the transmitted reference signal $Sr$ and has the positive or negative polarity thereof is determined in accordance with the sign of said difference. This detected voltage $dv$ is applied to the modulator 4.

On the other hand, the transmitted reference signal $Sr$ passed through the delay circuit 3 is applied to the modulator 4. A delay time $\Delta\tau$ of the delay circuit 3 is so determined that an instantaneous fluctuated phase-position of the transmitted reference signal passed through the delay circuit 3 is timed with an instantaneous fluctuated value of the voltage $dv$ at the modulator 4.

In the modulator 4 which is a phase-modulator, the transmitted reference signal $Sr$ is phase-modulated by an amount which has an instantaneous absolute value proportional to that of the detected voltage $dv$ and an instantaneous polarity opposite to that of the transmitted reference signal $Sr$ passed through the delay circuit 3.

As a result of the construction and operation of the system of this invention, fluctuation-in-phase-position of the transmitted reference signal $Sr$ can be eliminated. Consequently, a reference signal from which the fluctuation disturbed in the transmission medium is substantially eliminated is derived from the modulator 4 and applied to an output terminal 2.

Fluctuation-in-frequency of the transmitted reference signal $Sr$ can be also eliminated in this system. In this case, however, the detector 5 detects a frequency-difference between frequencies of the standard signal $Ws$ and the transmitted reference signal $Sr$, and the modulator 4 operates as a frequency-modulator. Moreover, an instantaneous level of the detected voltage $dv$ is proportional to an instantaneous value of the frequency-difference.

The reference signal $Sr$ from which the fluctuation is eliminated as a described above can be employed as "reference signal" of a predetermined purpose, such as demodulation of phase- or frequency-modulated waves transmitted through the same transmission medium as the reference signal $Sr$ In case of a repeator in a relay station, the reference signal $Sr$ derived therefrom is retransmitted, if necessary, after its amplitude is amplified. If the system of this invention is employed in each of a plurality of relay stations in a long transmission line, the reference signal $Sr$ can be transmitted through the long transmission line irrespectively of fluctuation-in-phase-position or in frequency occurring at any of the relay station or other transmission medium.

Figure 2:
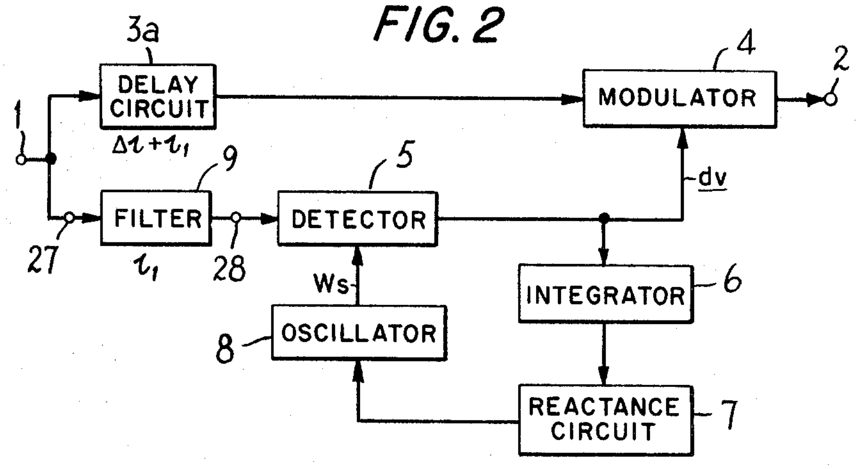

FIG. 2 shows an embodiment of this invention in which fluctuations of a plurality of transmitted signals including the reference signal $Sr$ can be simultaneously eliminated. In this embodiment, a filter 9 is arranged before the detector 5 as means for deriving only the transmitted reference signal $Sr$ from the transmitted signals into which the transmitted signal $Sr$ is included. A delay time $(\Delta\tau+\tau_1)$ of the delay circuit 3*a* is determined so as to further compensate a delay time $\tau_1$ of the filter 9. If it can be assumed that a plurality of signals which are transmitted in the same transmission path are disturbed by the same fluctuation-in-phase-position or in-frequency, such fluctuation can be simultaneously eliminated in this system even if detection of the voltage $dv$ is carried out as to the difference between phase-positions or frequencies of the standard signal $Ws$ and the reference signal passed through the filter 9.

Figure 3:
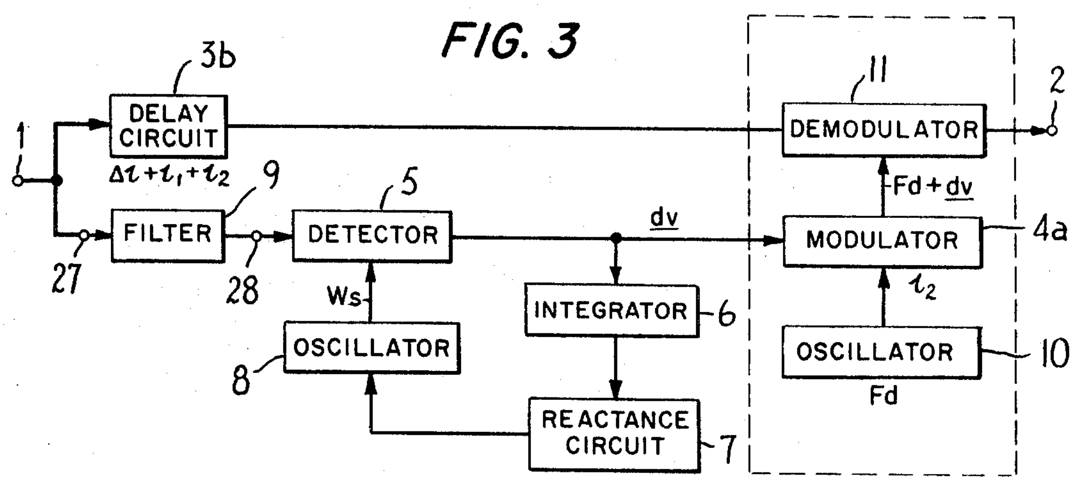

FIG. 3 shows another embodiment of this invention in which a communication signal accompanied by the reference signal $Sr$ for demodulation can be correctly demodulated irrespectively of fluctuation in-phase-position or in-frequency. In this embodiment, there are further provided with an oscillator 10 and a demodulator 11. The oscillator 10 generates a signal $Fd$ having a stable frequency which is substantially equal to that of the reference signal $Ws$, the signal $Fd$ is employed as a reference signal for demodulating the communication signal transmitted. At the output of the modulator 4*a*, a signal $(Fd+dv)$ which is produced with modulating the frequency $Fd$ by the difference $dv$ is obtained. A delay time $(\Delta\tau+\tau_1+\tau A2)$ of the delay circuit 3*b* is determined so as to further compensate a delay time $\tau_2$ of the modulator 4*a* in comparison with the delay circuit 3*a*. In case the communication signal is generally disturbed by the same fluctuation as that of the reference signal $Sr$, the communication signal can be correctly demodulated by the reference signal $(Fd+dv)$ which includes a fluctuation component $dv$ for compensating a fluctuation component of the communication signal. If the communication signal is a suppressed carrier amplitude-modulated wave or a phase-modulated wave, a ring modulator is employed as the demodulator 11. In order to demodulate a plurality of communication signals, there are provided a plurality of sets of combination circuits each comprising the oscillator 10, the modulator 4*a*, and the demodulator 11. In this case, however, the respective oscillators (10, 10*a*, 10*b* ...; 10*a*, 10*b* ... not shown) generate different reference signals $Fd_1$, $Fd_2$, $Fd_3$ ... respectively for demodulating the plurality of communication signals.

Figure 4:
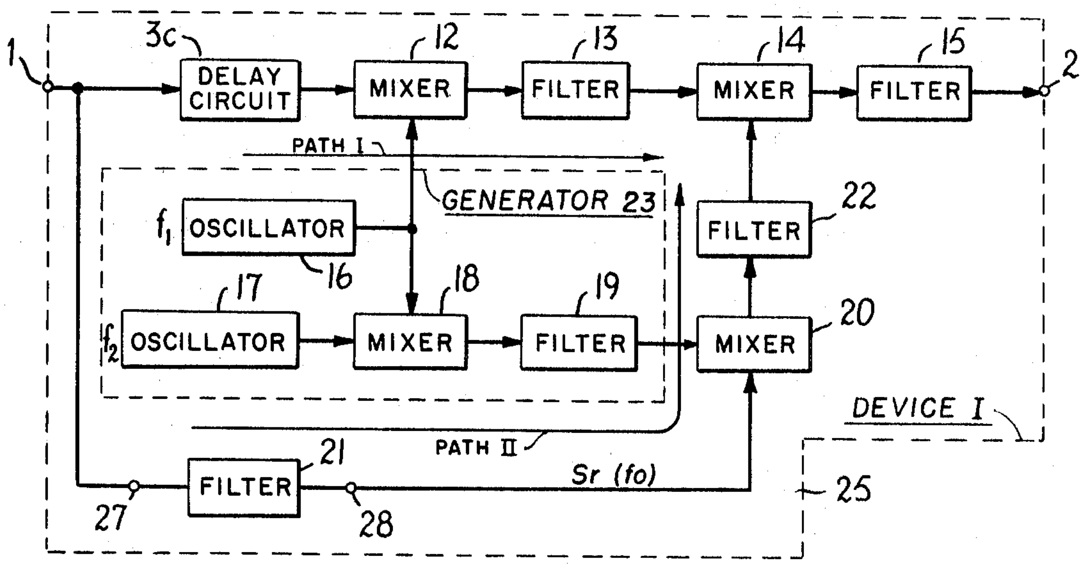

Referring to FIG. 4, another embodiment of this invention comprises a generator 23, a first mixer 20, a delay circuit 3*c*, a second mixer 14 and a filter 21. The generator 23 comprises oscillators 16 and 17, a mixer 18 and a filter 19.

In this system, fluctuation in-phase-position or in-frequency of a plurality of transmitted signals including a reference signal can be simultaneously eliminated. Now, it is assumed that such a plurality of transmitted signals $\sum^{n} f_0\pm\Delta f_i$ (when $i=0$, $\Delta f_i 0$; $n$ is an integer) are applied to the input terminal 1. The reference signal $Sr$ having the frequency $f_o$ is filtered through the filter 21 and applied to the first mixer 20. To this mixer 20, a signal having the sum of (or difference between) frequencies $f_1$ and $f_2$ which are respectively frequencies of the oscillators 16 and 17. The sum (or the difference) is derived from the mixer 18 and the filter 19 Outside and inside of parentheses employed above or to be employed below correspond respectively A sum $f_1\tilde{+}f_2+f_o$ of (or a difference $f_1\tilde{+}f_2\sim f_0$ between) frequencies of two input signals $(f_1+f_2)$ and $f_o$ of the first mixer 20 is derived through a filter 22 from the mixer 20. The symbol " " is employed to indicate a difference between two values arranged at two sides of the symbol. Selection of this sum or difference is determined according to the principle in which the sum is selected if the frequency $f_o$ is higher than the frequency $f_1$ and the difference is selected when $f_o>f_1$.

On the other hand, the transmitted signal $\Sigma f_o\pm\Delta f_i$ applied from the input terminal 1 is applied, through the delay circuit 3*c*, to a mixer 12. Two inputs of the mixer 12 are mixed at the mixer 12, and a sum $\Sigma f_o\pm\Delta f_i f_1$ of (or a difference $\sum f_0\pm\Delta f_i \sim f_1$ between) them is derived, through a filter 13, from the mixer 12 and further applied to the second mixer 14.

This operation can be more comprehensibly described with reference to a definite example. If the frequencies $f_o$, $f_1$ and $f_2$ are 10 kilo-cycles, 100 kilo-cycles and 10 kilo-cycles respectively, the filter 13 picks up a frequency 90 kilo-cycles $\pm\Delta f_i$ (or 110 kilo-cycles $\pm\Delta f_i$), and the filter 19 picks up a frequency 90 kilo-cycles (or 110 kilo-cycles), the filter 22 picking up a frequency 110 kilo-cycles.

In this case, it is possible to assume that a plurality of signals transmitted through the same communication path are disturbed by the same fluctuation in-phase-position or in-frequency. Accordingly, if the communication signals and the reference signal are similarly shifted in-phase-position or in-frequency by a value $\Delta p$ into a delayed or lower direction, the frequency $f_o$ of the reference signal $Sr$ passed through the filter 21 is shifted to a frequency $f_o-\Delta p$. However, the output frequency of the filter 19 is not shifted because this has no relationship with the shift. As a result of such condition, the output frequency of the filter 22 is delayed in-phase-position or reduced in-frequency by the value $\Delta p$, thereby becoming a frequency $f_1\tilde{+}f_2\tilde{+}f_0-\Delta p$.

On the other hand, since the communication signals are delayed in-phase-position or reduced in-frequency by the value $\Delta p$, the output frequency of the filter 13 is similarly shifted, thereby producing a frequency $f_1\tilde{+}\sum(f_o\pm\Delta f_i\Delta p)$ which is applied to the second mixer 14.

In this case, the delay time of the delay circuit 3*c* is so determined that an instantaneous fluctuated phase-position or frequency of each of the communication signals is timed with an instantaneous fluctuated value $\Delta p$ of the output frequency of the filter 22. In other words, a transmission time of the communication signal necessary to pass a path I (the delay circuit 3*c*—the mixer 12—the filter 13—the mixer 14) is substantially equal to a transmission time of the reference signal $Sr$ necessary to pass a path II (the filter 21—the mixer 20—the filter 22—the mixer 14).

Accordingly, since instantaneous fluctuated values included in two input signals of the mixer 14 coincide with one another, if the filter 15 picks up the difference between frequencies of two inputs of the mixer 14 the fluctuations included in the communication signals are substantially eliminated at the output side of the filter 15. The output frequency of the filter 15 is the difference between frequencies $f_1\tilde{+}\Sigma\ (f_o\pm f_i-p)$ and $f_1\tilde{+}f_2+f-\Delta p$ as understood from the above-mentioned condition, that is, $\Sigma(f_2\pm\Delta f_i)$. Accordingly, if the frequency $f_o$ equal to the frequency $f_2$, frequencies of the output signals applied to the output terminal 2 correspond respectively to those of the transmitted communication signals. As a matter of course, if the frequency $f_o$ is higher or lower than the frequency $f_1$, frequencies of the transmitted communication signals are converted to different frequencies. In any case, the fluctuation component $\Delta p$ can be eliminated from the transmitted communication signals.

If frequencies of the communication signals are identically shifted in-phase-position or in-frequency into the advanced or higher direction, directions of fluctuations included in two inputs of the mixer 14 are identical to each other. Accordingly, the fluctuation component $\Delta p$ can be eliminated by similarly picking up the difference between frequencies of the two inputs at the mixers 14 and 15.

Moreover, if the filter 13 picks up the difference between frequencies of the two kinds of inputs of the mixer 12, the filter 19 picks up the sum of frequencies of the two inputs of the mixer 18.

In the above description, the elimination operation of such fluctuation performed by picking up, at the filter 15, the difference between frequencies of two kinds of inputs of the mixer 14 has been disclosed. As the case may be, the elimination operation can be carried out by picking up, at the filter 15, the sum of frequencies of the two inputs of the mixer 14. The principle of this case will be described in details below with reference to FIG. 9.

Figure 5:
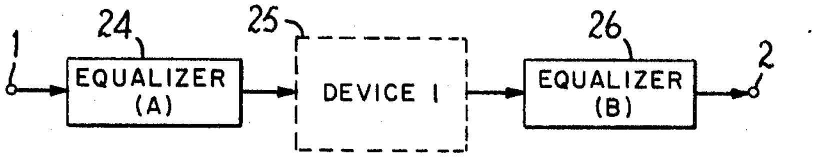

FIG. 5 shows another embodiment of this invention in which such fluctuations included in the transmitted communication signals are more completely eliminated. In this system, there are further provided a phase-equalizer (a delay-equalizer) 24 before a circuitry 25 and a phase-equalizer 26 after the circuitry 25, the circuitry 25 corresponding to the device I shown in FIG. 4. It was assumed, as to the system shown in FIGS. 2, 3 and 4, that a plurality of signals transmitted through the same communication path are disturbed by the same fluctuation in-phase-position or in-frequency. In an actual transmission medium, however, it is usual that transmission times of a plurality of communication signals are different to one another. Accordingly, the elimination operation carried out by the mixer 14 cannot be performed completely in the system shown in FIGS. 2, 3 and 4.

The equalizer 24 is employed for excluding such incompleteness of fluctuation-elimination. If the communication signals are transmitted through a transmission medium including a plurality of relay stations, the equalizer 24 compensates and equalizes a phase-characteristic of a path from a relay station or a transmission medium at which such fluctuation occurs to a station at which the system of this invention is positioned. In an actual case, there may be provided a plurality of phase-equalizers which compensate the respective relay sections and are connected in a cascade arrangement, and the equalizer 24 is obtainable by selecting the connection junctions of the plurality of equalizers.

Figure 6:
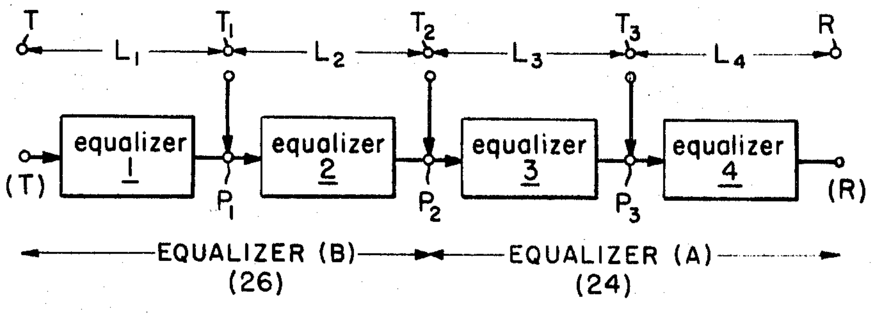
FIG. 6 is a block diagram for explaining equalizers to be used in the system of this invention.

FIG. 6 shows principle of construction of this equalizer 24. If the communication signals are transmitted from a sending station T to a receiving station R through relay stations $T_1$, $T_2$ and $T_3$, there are provided, as the equalizer 24, a plurality of equalizers 1, 2, 3, and 4 which compensate the respective relay sections $L_1$, $L_2$, $L_3$ and $L_4$ and are connected in a cascade arrangement. While the transmitted signals are applied to the input terminal of the equalizer 4, the input terminal 1 is connected to a connection junction $p_1$, $p_2$or $p_3$ corresponding to a relay station at which the fluctuation occurs. A correct junction point for connecting the input terminal 1 can be selected by trial and elimination. For example, if it is decided that fluctuation occurs at a relay station $T_2$, the input terminal 1 is connected to the junction $p_2$ as shown in FIG. 6, whereby the equalizer 24 comprises the equalizer 3 and 4.

In arranging the equalizer 24 before the device I, instantaneous fluctuated values of two inputs of the mixer 14 coincide with each other, whereby the fluctuation can be completely eliminated in the system shown in FIG. 5. This application of the equalizer 24 to the device I positioned at the receiving station R is equivalent to an application of the device I to a relay station at which said fluctuation occurs.

The phase-equalizer 26 is employed for compensating and equalizing phase-characteristics of other sections which are not yet compensated by the equalizer 24. In case of FIG. 6, the equalizer 26 comprises the equalizer 1 and 2 corresponding to the respective relay sections $L_1$ and $L_2$. By the use of said equalizers 24 and 26, transmission times of all the communication signals including the reference signals S*r* can be equalized at the output terminal 2 of the system of this invention.

As the matter of course, these equalizers 24 and 26 can be applied to the systems shown in FIGS. 1 and 2. In the system shown in FIG. 3, the equalizer 24 and be applied to the input side of the system.

Figure 7:
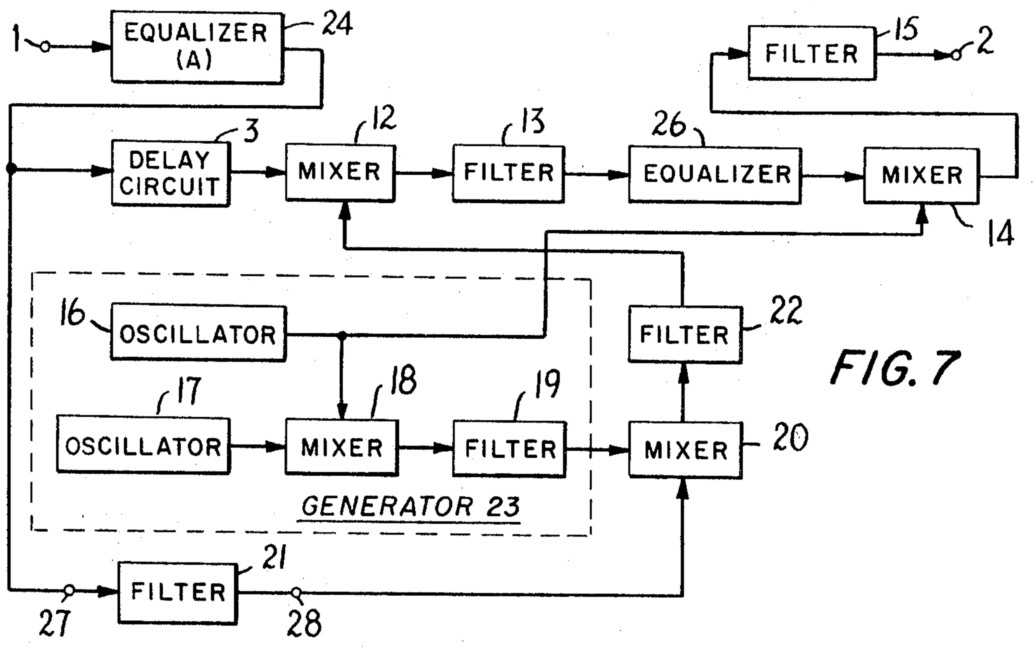

FIG. 7 shows another embodiment of this invention in which said equalizers 24 and 26 are employed. Different features from the system shown in FIG. 4 is connection between the filter 22 and the mixer 12 and connection between the oscillator 16 and the mixer 14. The equalizer 26 is inserted just preceding the mixer 14. Elimination operation of said fluctuation is carried out at the mixer 12. The operation of this system can be understood on reference to the operation of the systems shown in FIGS. 4 and 5, so that details thereof are omitted. But, the principle of this system will be understood by the description disclosed with reference to FIG. 9.

Figure 8:
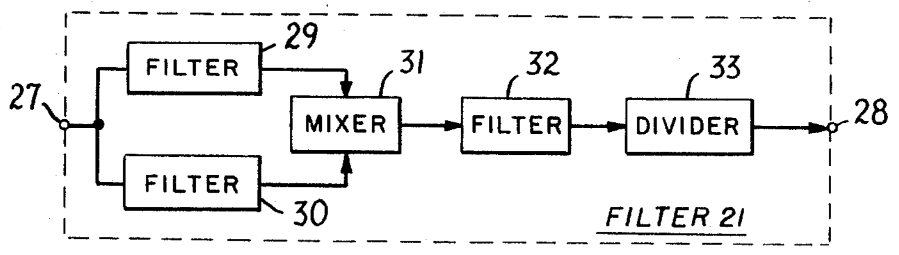
FIG. 8 is a block diagram for illustrating an example of means for deriving a transmitted reference signal from transmitted signals to be used in the system of tnis invention.

Construction and operations of the above-mentioned systems have been described, for comprehensible explanation, as if the transmitted reference signal has a continuous stable phase-position or frequency. However, a reference signal having a plurality of quantized phase-positions of frequencies can be employed as the reference signal S*r*. FIG. 8 shows filter means 21 for applying it against a reference signal having two quantized phase-positions. The filters 29 and 30 are employed for picking up respectively the first lower sideband component $(f_o-s_1)$ and the first upper sideband component $(f_o+\Delta s_1)$ of such reference signal. The sum $2f_o$ of the sideband components $(f_o+\Delta s_1)$ and $(f_o-\Delta s_1)$ is derived, through a filter 32, from a mixer 31. A divider 33 converts the frequency of the sum $^2f_o$ so as to produce a reference signal having a continuous frequency $f_o$. An input terminal 27 and an output terminal 28 of the filter 21 are designated in other systems shown in FIGS. 2, 3, 4 and 7.

Figure 9:
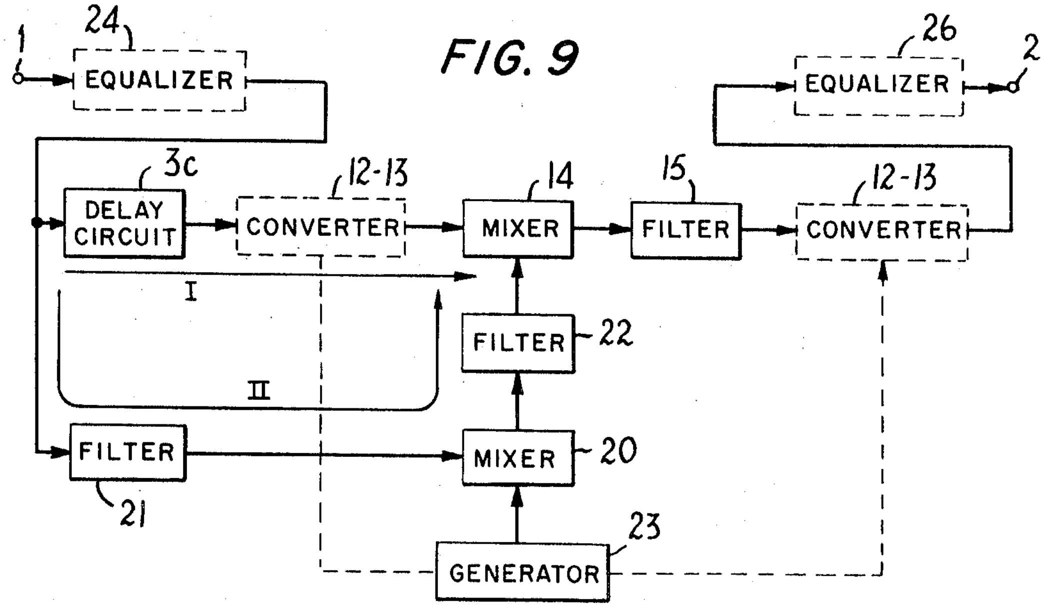
FIG. 9 is a block diagram for explaining the principle of the system of this invention.

Referring to FIG. 9, the principle of the system shown in FIGS. 4, 5, 6 and 7 is described hereinafter more comprehensibly.

1. The system is provided with a generator 23 for generating at least one output signal having a stable frequency (F*o*).
2. The transmitted reference signal S*r* (frequency F*r*) and the output signal (frequency F*o*) of the generator 23 are mixed at the first mixer 20.
3. If the reference signal S*r* is transmitted together with communication signals, the system is provided with the filter 21 for deriving the reference signal from the transmitted signals.
4. From the first mixer 20, the sum of or difference between frequencies (F*o* and F*r*) of two inputs of the first mixer 20 is derived through the filter 22.
   - i. In case where the difference is derived from the first mixer 20:
     - a. If the frequency F*o* is less than the frequency F*r*, fluctuation appears at the output of the filter 22 in the same polarity ($\pm\Delta p$) as that of the reference signal.
     - b. If the frequency F*o* is higher than the frequency F*r*, the fluctuation ($\pm\Delta p$) at the output of the filter 22 in the opposite polarity ($\pm\Delta p$) to that of the reference signal.
   - ii. In case where the sum is derived from the first mixer 20:
     - a. If the frequency F*o* is more than the frequency F*r*, the fluctuation ($\pm\Delta p$) appears at the output of the filter 21 in the same polarity ($\pm\Delta p$) as that of the reference signal.
     - b. If the frequency F*o* is less than the frequency F*r*, the fluctuation ($\pm\Delta p$) appears at the output of the filter 21 in the opposite polarity ($\mp\Delta p$) to that of the reference signal.
5. The system is provided with, if necessary, a converter (12–13) for convertive the frequency F*r* of the transmitted reference signal S*r* to a desired frequency at either of the designated two places as shown in FIG. 9.
6. The system is provided with the second mixer 14 at which the output signal derived from the first mixer 20 and the transmitted signals or the output of the converter (12–13) are mixed.

7. The delay means 3c is in a path I for passing the transmitted signals from the input terminal 1 to the second mixer 14. The delay time of the delay means 3c is so determined that a time for passing the transmitted signal through the path I is substantially equal to a time for passing the reference signal through a path II (the filter 21, the mixer 20 and the filter 22). Accordingly, an instantaneous fluctuated phase-position or frequency of the signal passed through the path I is timed with an instantaneous fluctuated value of the reference signal passed through the path II.
8. From the second mixer 14, the sum of or the difference between frequencies of two inputs applied from the paths I and II is derived so that the fluctuation ($\pm\Delta p$) is eliminated. In other words, in case the fluctuation ($\pm\Delta p$) included in the signal passed through the path II has the same polarity ($\pm\Delta p$) of fluctuation as that of the signal passed through the path I, the difference between frequencies of said two signals applied from the paths I and II is derived from the second mixer 14. On the contrary, in case the fluctuation ($\pm\Delta p$) included in the signal passed through the path II has the opposite polarity ($\mp\Delta p$) of fluctuation to that of the signal passed through the path I, the sum of frequencies of the two signals applied from the paths I and II is derived from the second mixer 14.
9. If the output signal of the filter 15 has a frequency different from the frequency of the transmitted signal applied to the input terminal 1 and it is necessary to change the frequency of the output signal of the filter 15, the change of frequency is carried out at a converter (12–13) by use of an output signal of the generator 23. This converter (12–13) is arranged before the second mixer 14 in the path I as described above or after the filter 15 as described just above.
10. If transmission times of the reference signal and other communication signals which are transmitted through a passband of a transmission medium are different from each other, application of the equalizer 24 (and the equalizer 26, if necessary) brings about a more desirable effect for elimination of the fluctuations.

As described above in detail, the systems of this invention effectively eliminate fluctuation in-phase-position or in-frequency included in a transmitted communication signals including the reference signal. Accordingly, a system of this invention can be effectively employed for retransmitting or receiving phase-modulated telegraphic signals, such as a Kineplex communication system (U.S. Pat. No. 2,905,812) and frequency division multiplex telecommunication signals.

I claim:

1. A system for eliminating unknown sudden phase fluctuations in transmitted telegraph signals including a reference signal which is separable by filter means, comprising: equalizing means for equalizing transmission times of the respective signals transmitted in a transmission medium at one end of which said unknown sudden fluctuations occur, filter means coupled to said equalizing means for deriving the reference signal from the transmitted signals passed through said equalizing means, generator means for generating a standard signal having a substantially stable phase-position, detection means coupled to said filter means and said generator means for detecting a phase difference between the standard signal and the transmitted reference signal derived from the filter means, delay means coupled to said equalizing means for delaying for a given delay time the transmitted signals passed through said equalizing means, modulation means coupled to said delay means and said detection means for modulating the transmitted signals passed through said delay means in accordance with said difference to cancel said fluctuations, and means coupled between said generator means and detection means for synchronizing the phase-position of said standard signal with an average phase-position of said transmitted reference signal integrated during a time considerably longer than the duration of said fluctuations, said delay means having a delay time determined so that instantaneous fluctuated phase-positions of the transmitted signals are timed with instantaneous values of the difference at the modulation means, whereby the unknown sudden phase fluctuations included in the transmitted signals and usually not received simultaneously are eliminated simultaneously in the modulation means.

2. A system for eliminating unknown sudden phase-fluctuations in transmitted telegraph signals including a reference signal which is separable by filter means, comprising: equalizing means for equalizing transmission times of the respective signals transmitted in a transmission medium at one end of which said unknown sudden fluctuations occur, filter means coupled to said equalizing means for deriving the reference signal from the transmitted signals passed through said equalizing means, generator means for generating a standard signal having a substantially stable phase-position, a fist mixer coupled to said generator means and said filter means for detecting a difference between the standard signal and the transmitted reference signal derived from the filter means, delay means coupled to said equalizing means for delaying the transmitted signals passed through said equalizing means, a second mixer coupled to said delay means and said first mixer for combining the transmitted signals passed through said delay means with said detected difference to cancel said fluctuations, the delay time of said delay means being determined so that instantaneous phase fluctuations of the transmitted signals are timed with instantaneous fluctuated values of the difference at said second mixer, whereby the unknown sudden fluctuations included in the transmitted signals and usually not received simultaneously are simultaneously eliminated in the second mixer.

3. A system for eliminating unknown sudden phase-fluctuations in transmitted telegraph signals as set forth in claim 1, in which said detection means comprising means for producing a voltage which varies in amplitude in proportion to said detected phase-difference, and said modulation means comprises means responsive to said variable voltage for canceling said fluctuations.

4. A system for eliminating unknown sudden phase- and frequency-fluctuations in transmitted telegraph signals including a reference signal which is separably by filter means, comprising: filter means for deriving the reference signal from said transmitted signals; generator means for generating a standard signal having a substantially stable phase-position and substantially stable frequency; detection means coupled to said filter means for detecting phase- and frequency-differences between said standard signal and said transmitted reference signal derived from said filter means, and for producing a voltage which varies in amplitude in proportion to said detected phase and frequency differences; delay means for delaying for a given delay time the transmitted signals; modulation means coupled to said delay means and said detection means for modulating the transmitted signals passed through the delay means in response to said variable voltage to cancel said fluctuations, whereby the unknown sudden fluctuations included in said transmitted signals and usually not received simultaneously are eliminated in said modulation means.

5. A system for eliminating undesired fluctuations in transmitted telegraph signals including a transmitted reference signal which is separable by filter means, comprising: equalizing means for equalizing respective transmission times of said transmitted signals; generator means having first and second outputs for producing stable signals at said respective outputs; first filter means coupled to said equalizing means for deriving said reference signal; first mixing means having first and second inputs and having an output, said first filter means being coupled to said first input of said first mixer means, and said first output of said generator means and said second input of said first mixer means being interconnected; a delay circuit having an input connected to said equalizing means, and having an output; second mixer means having first and second inputs and an output, and having said output of said delay circuit connected to said first input thereof, and having said second output of said generator means connected to said second input thereof; second and third filter means coupled respectively to said outputs of said first and second mixer means, third mixer means having an output, and having first and second inputs coupled respectively to said outputs of said second and third filter means; and an output filter coupled to the output of said third mixer means; wherein said third filter provides said telegraph signals as an output, said undesired fluctuations having been eliminated.

6. The invention as set forth in claim 5, in which said generator means comprises first and second oscillators, fourth mixer means, and a fourth filter, the output of said first oscillator being connected as a first input to said fourth mixer means, and the output of said second oscillator being connected as a second input to said fourth mixer means and to the second output of said generator means, said fourth filter being coupled between said first output of said generator means and the output of said generator means and the output of said fourth mixer means.